UNITED STATES PATENT OFFICE.

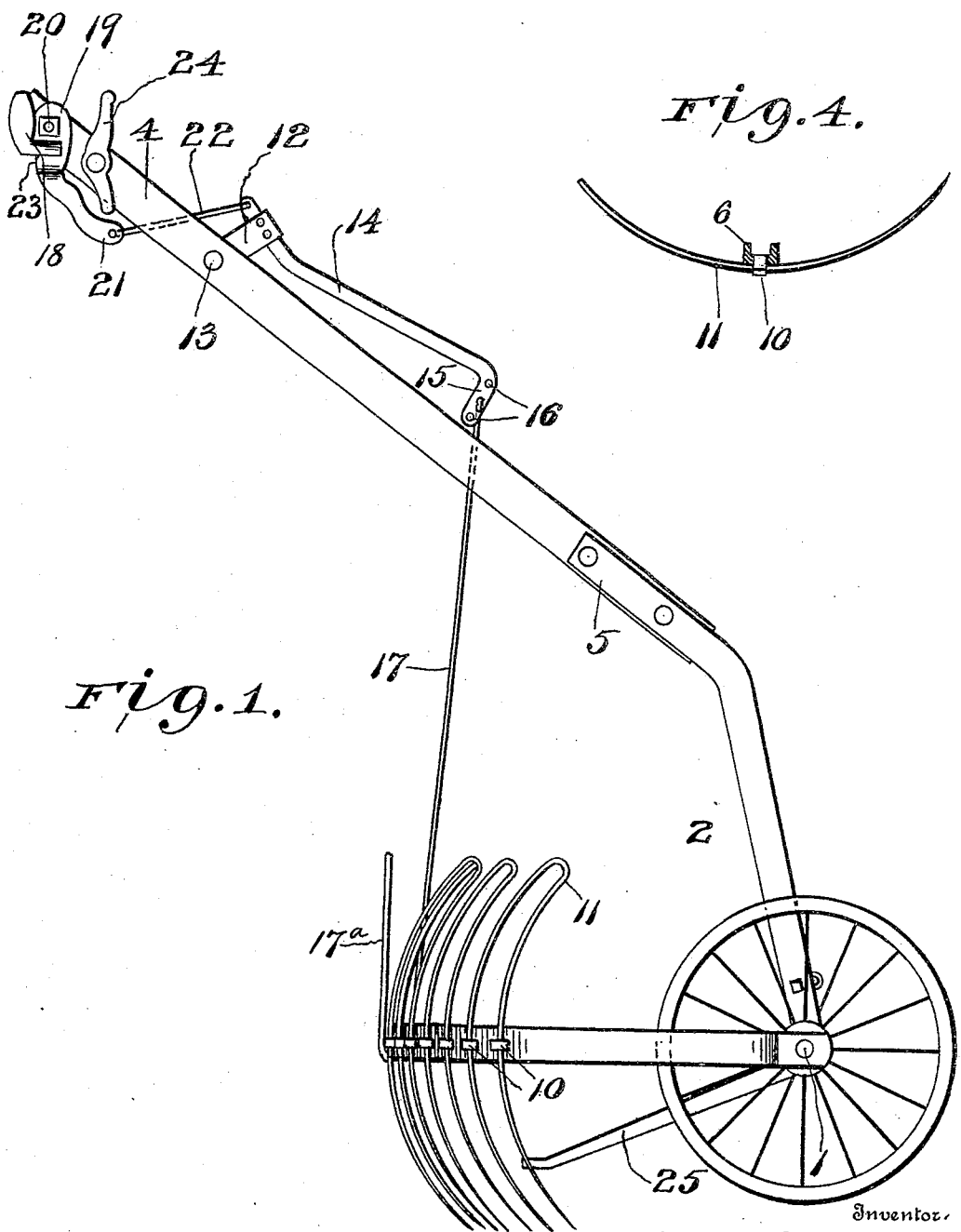

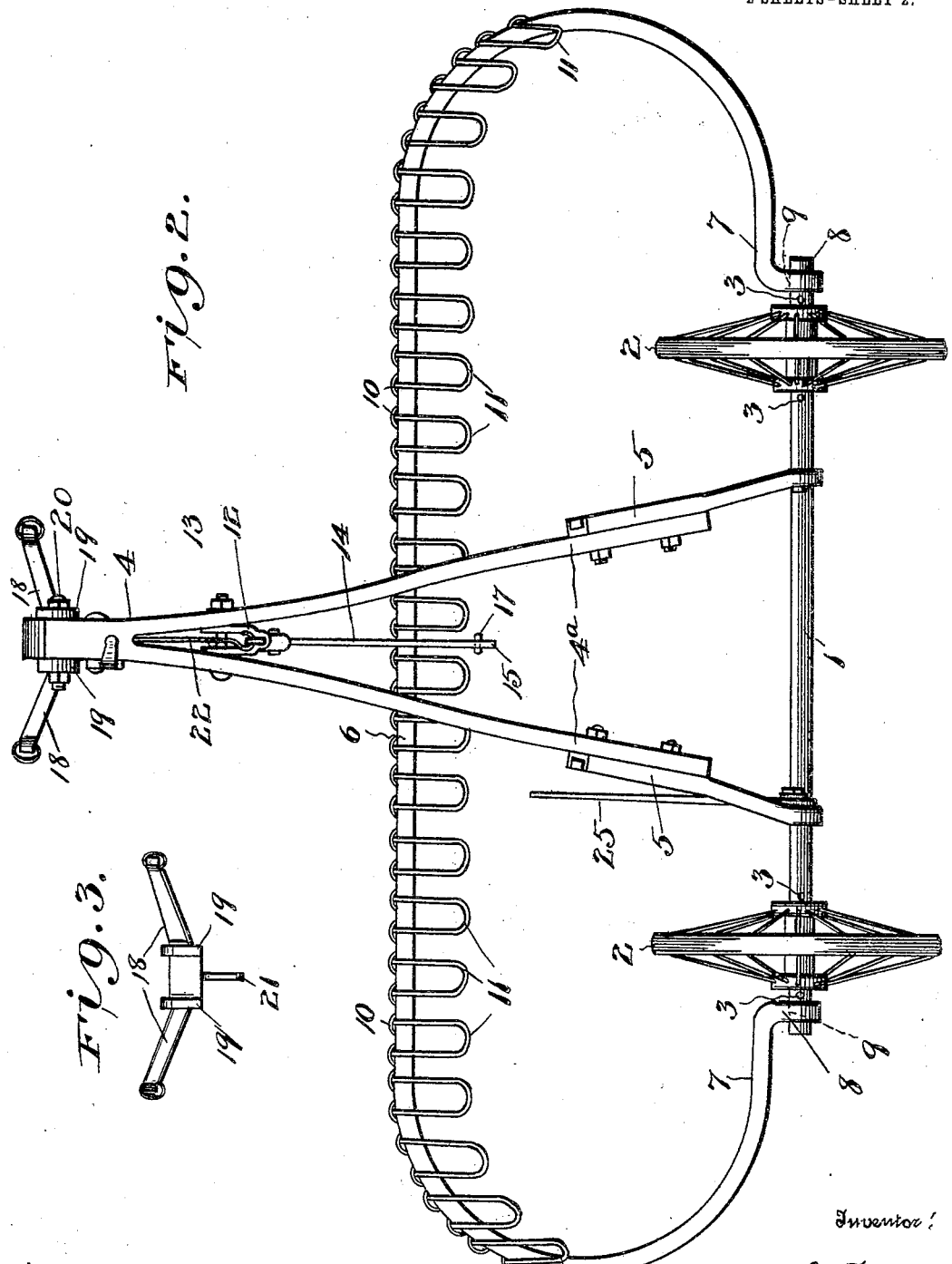

ALFRED E. FOX, OF REDKEY, INDIANA, ASSIGNOR OF ONE-HALF TO WILLIAM WILLIAMS AND EDWARD GOOD, BOTH OF REDKEY, INDIANA.

WHEELED RAKE.

932,011.  Specification of Letters Patent.  Patented Aug. 24, 1909.

Application filed January 2, 1909. Serial No. 470,448.

*To all whom it may concern:*

Be it known that I, ALFRED E. FOX, a citizen of the United States, residing at Redkey, in the county of Jay and State of Indiana, have invented certain new and useful Improvements in Wheeled Rakes, of which the following is a specification.

My invention relates to hand-rakes for raking large lawns, and grass-plots in parks, cemeteries, etc., and has for its object the provision of a wheeled device having a handle loosely secured to the axle and a rake having teeth secured to a bar curved at its ends and formed with holes that loosely engage the ends of the axle, the hand-holds of the handle being connected with the rake bars by means of a lever and rods, so that the rake may be raised periodically to dump the contents thereof.

The construction and operation of my improved rake will be described in detail hereinafter and illustrated in the accompanying drawings, in which—

Figure 1 is a side view, in elevation, of my improved rake; Fig. 2, a top plan view; Fig. 3, a detail view of the hand-hold lever; and Fig. 4, a section of the rake-bar, showing one of the teeth.

In the drawings similar reference characters indicate corresponding parts throughout the several views.

The axle 1 has the wheels 2 journaled thereon and held from longitudinal movement thereon by means of pins 3. The handle 4 has forked arms 4ª secured to channel bars 5 secured to axle 1.

The rake-bar 6 is formed of channel steel, and has its ends bent toward one another, as shown at 7, and then toward the front, as shown at 8, and provided with holes 9 to engage the ends of the axle 1. Rake-bar 6 is punched at intervals to form eyes or stirrups 10 to receive the rake-teeth, formed of U-shaped bars 11, curved as shown in Fig. 4, so as to present the concaved portion toward the front of the machine.

The ends of the rake-bar 6 are held in position in the ends of axle 1 by the resilience of the bar, so that the bar may be removed and the rake reversed when desired, the pointed ends of the teeth being used to clear the lawn of cut grass, while the bent portions of the teeth may be used to clear the lawn of leaves.

12 indicates an arm pivotally secured to bolt 13, connecting the two arms 4ª of the handle, and 14 a lever secured to said arm and having a downwardly-extending end 15 provided with a series of holes 16.

17 indicates a bar secured in one of the holes 16 and having its free end formed with a hook 17ª that engages rake-bar 6.

The handle-bar 18 is provided with ears 19, and 20 indicates a bolt secured through said ears and the rear end of the handle 4.

21 indicates an arm extending downwardly from the middle of handle-bar 18, which is connected with the free arm of lever 14 by link 22.

23 indicates a recess in the upper edge of arm 21, and 24 a pivoted clamp to engage said depression when it is desired to hold the rake-teeth in an inoperative position.

25 indicates an arm secured to one of the bars 5 that engage the ground to hold the handle in a raised position when not in operation.

In operation the rake is pushed ahead of the operator, who by grasping the hand holds on the handle bar 18 controls the position of the rake-bar and teeth, for by simply pushing against the handle bars the machine is pushed along ahead, while by turning the handle-bars backwardly and upwardly the rake bar is lifted to dump the contents of the rake.

Having thus described my invention, what I claim is—

1. In a rake, an axle having wheels journaled thereon, a rake-bar removably and replaceably secured to the axle, a handle secured to the axle, a handle-bar pivotally secured to said handle, and operative connections between the handle-bar and rake-bar to raise it into an inoperative position, substantially as shown and described.

2. In a rake, an axle having wheels journaled thereon, a rake-bar removably and replaceably secured to the axle, a handle secured to the axle, a handle-bar pivotally secured to said handle, a lever fulcrumed on said handle, a link connecting the handle-bar and the lever, and a rod connecting the lever and the rake-bar, substantially as shown and described.

3. In a rake, an axle having wheels journaled thereon, a rake-bar having its ends bent toward each other and then parallel with each other and provided with holes in its ends to engage the ends of the axle, a handle secured to the axle, a handle-bar pivotally secured to said handle, and operative connections between the handle-bar and rake-bar to raise it to an inoperative position, substantially as shown and described.

4. In a rake, an axle having wheels journaled thereon, a rake-bar having its ends bent toward each other and then parallel with each other and provided with holes in its ends to engage the ends of the axle, a handle secured to the axle, a handle-bar pivotally secured to said handle, a lever fulcrumed on said handle, a link connecting the lever and handle-bar, and a rod connecting the lever and the rake-bar, substantially as shown and described.

5. A rake comprising an axle having wheels journaled thereon, a rake-bar having its ends bent toward each other and then toward the front on parallel planes and formed with holes to loosely engage the ends of the axle, the rake-bar formed with eyes, U-shaped teeth engaging said eyes, said teeth concaved toward the axle, a V-shaped handle secured to the axle, a handle-bar pivotally secured to said handle and having an arm extending therefrom and formed with a recess, a lever fulcrumed on said handle, a link connecting said lever and the arm on the handle-bar, a rod secured to the lever and having its free end formed with a hook and engaging the rake-bar, and a clamp pivotally secured to the handle to engage the recess in the arm aforesaid, substantially as shown and described.

In testimony whereof I affix my signature in presence of two witnesses.

ALFRED E. FOX.

Witnesses:
HENRY E. COBLE,
JOSEPH B. ANCHENY.